(No Model.)

J. W. BATTELLE.
ANIMAL TETHER.

No. 244,843. Patented July 26, 1881.

Witnesses,
James H. Bancroft
Albert A. Barker.

Inventor,
Joseph W. Battelle

UNITED STATES PATENT OFFICE.

JOSEPH W. BATTELLE, OF WORCESTER, MASSACHUSETTS.

ANIMAL-TETHER.

SPECIFICATION forming part of Letters Patent No. 244,843, dated July 26, 1881.

Application filed December 3, 1880. (No model.)

*To all whom it may concern:*

Be it known that I, JOSEPH W. BATTELLE, of the city and county of Worcester, and State of Massachusetts, have invented certain new and useful Improvements in Animal-Tethers; and I do hereby declare that the following is a full, clear, and exact description of the same, reference being had to the accompanying drawings, forming a part of this specification, and in which—

Figure 1:
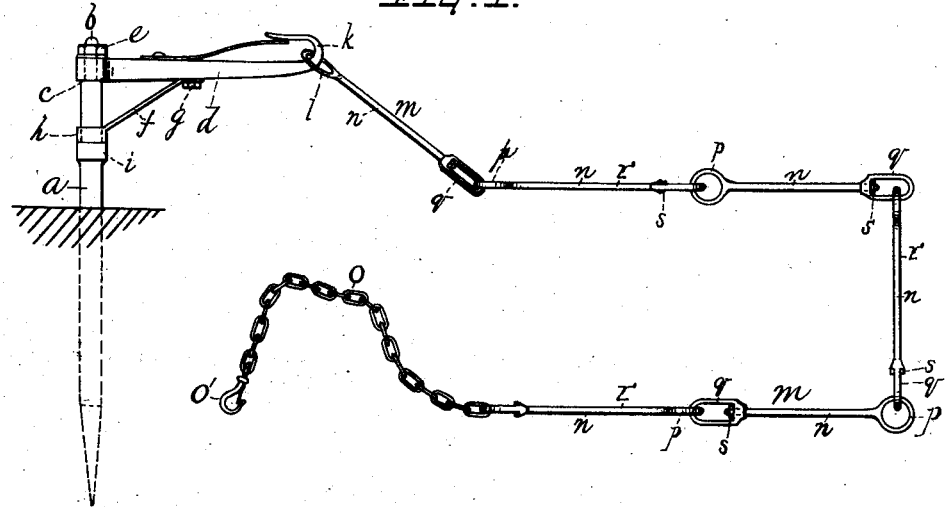
Figure 2:
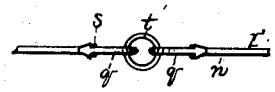
Figure 3:
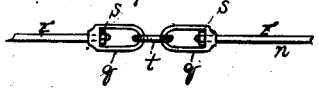

Figure 1 represents one of my aforesaid improved animal-tethers in position ready for use, and Figs. 2 and 3 represent modifications of said tether hereinafter described.

My invention is more especially designed for tethering small stock—such as calves, colts, sheep, &c.—but may be employed for securing larger animals, if desired. It consists in arranging a swinging arm upon the upper end of an upright standard or post, and of attaching, by means of a snap-hook, upon the outer end of said arm one end of a chain which is constructed of long and short links and provided at one end with a snap-hook, as will be hereinafter more fully described.

To enable those skilled in the art to which my invention belongs to make and use the same, I will proceed to describe it more in detail.

In the drawings, *a* represents a metal post which is pointed at its lower end, so that it may be easily driven into the ground. Its upper end is formed or turned down smaller, as shown by dotted lines, to form a spindle, *b*, and a shoulder, *c*, for the under side of swinging arm *d* to rest upon when placed upon said post, as represented in Fig. 1. Said swinging arm *d* is secured in position by means of a nut, *e*, turned upon the upper end of the post, threads being formed upon said parts for that purpose. To prevent swinging arm *d* sagging or swinging out of a horizontal line, a brace, *f*, is secured to the under side of arm *d* at *g*, which is provided with a ring or collar, *h*, at its lower end, so that it may be slipped down over the post and allowed to rest upon a collar, *i*, formed or secured upon said post. The outer end, *k*, of swinging arm *d* is made in the form of an ordinary snap-hook, being made smaller, and bent into the form of a hook, and a spring of the proper shape for the purpose secured to the upper side of said arm. By this arrangement the end *l* of chain *m* may be quickly and easily attached to the end of the swinging arm, or shortened, as hereinafter described. Said chain *m* is constructed in the following manner: It is made up of long links *n*, with the exception of a short section, *o*, at the end where the animal is secured, which is composed of ordinary small links, and provided at the end with a snap-hook, *o'*, for easy attachment to the halter of the animal to be tethered. The long links *n* are each provided in this instance with rings *p* at one end, formed upon the straight parts or rods *r* of the links, and at the other end with oblong loops or rings *q*, which are arranged to turn upon the ends of rods *r* by the ends of the rods being turned down smaller, and passing them through one end of the loops, and then securing them by means of nuts *s*, or otherwise. If desired, the rings *p* may also be arranged to turn upon the ends of the rods *r* in a similar manner.

By making the links *n* in long lengths and their rings or loops so that they will turn, as described, the chain is not liable to become snarled or twisted up, so as to get entangled with the feet and legs of the animal secured to the same.

The part *o*, which is formed of small links, as before described, is of only sufficient length to reach or just clear the surface of the ground when the animal is standing and holding its head raised in a natural position.

In practice, chains *m* are made of considerable length, so that the animal may graze for quite a distance from post *a*; but they may be shortened to any desired length by simply passing one of the rings *p* over the snap-hook *k* of the swinging arm.

Instead of forming post *a* of metal, as before described, it may be made of wood, in which case a metal spindle would be inserted into the upper end of the post for the swinging arm to turn upon, and a metal collar secured to the post at *i*.

In Figs. 2 and 3 the loop parts *q* are represented as being arranged upon both ends of rods $r$, and the links $n$ thus formed connected by means of rings $t$.

Having described my improvements in animal-tethers, what I claim therein as new and of my invention, and desire to secure by Letters Patent, is—

1. The tether consisting of the post $a$, provided with shoulder $c$, nut $e$, and collar $i$, the swinging arm $d$, provided at its outer end with the hook $k$, the brace $f$, provided with collar $h$, and the chain $m$, all constructed, combined, and operating substantially as shown and described.

2. In a tethering-chain, the combination of links $n$ with turning end rings or loops, $q$, arranged upon one or both ends of the same, and held in position by means of nuts $s$ or other suitable fastenings, substantially as shown and described.

JOSEPH W. BATTELLE.

Witnesses:
   JAMES H. BANCROFT,
   ALBERT A. BARKER.